to the weld on the article being welded, of a casing supported by the apparatus and enclosing the rod and the point of welding of the article, said casing having an edge closely adjacent the surface of the said article, and means for supplying to the interior of said casing at a point comparatively remote from the point of welding, an inert gas under pressure tending to exclude air, said inert gas having no deleterious effect on the metals during welding.

5. In welding apparatus the combination with means for supplying a rod of material to the weld on the article being welded, of a casing supported by the apparatus and enclosing the rod and the point of welding of the article, said casing engaging the surface of said article to form said enclosure, and means for supplying to the interior or said casing at a point comparatively remote from the point of welding and out of line with the weld rod, an inert gas under pressure tending to exclude air, said inert gas having no deleterious effect on the metals during welding.

JOHN B. HENDRICKSON.

March 11, 1930.  L. H. HUTCHINSON  1,749,767
PICTURE GRAPH MACHINE
Filed March 27, 1929
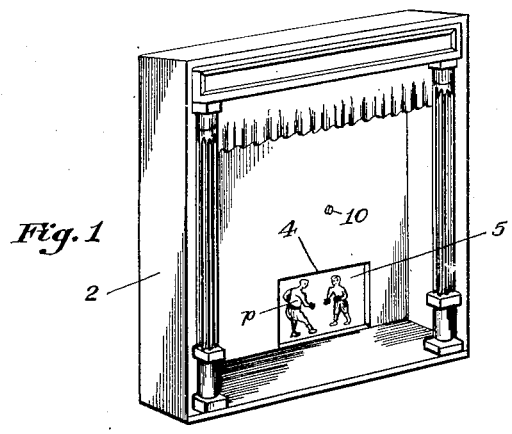
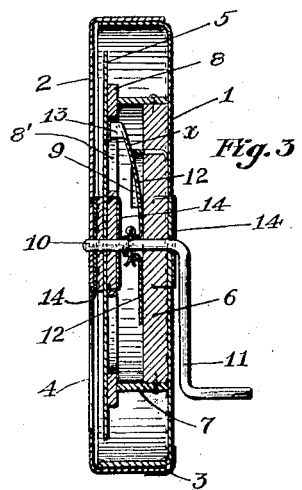
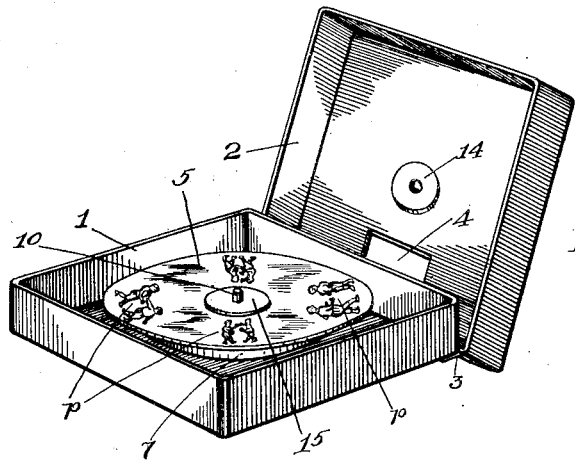
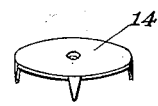
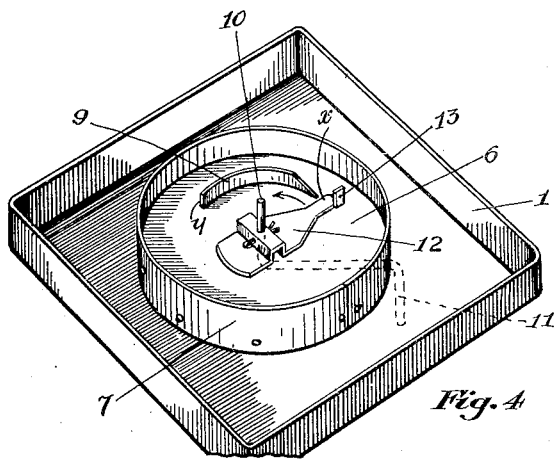
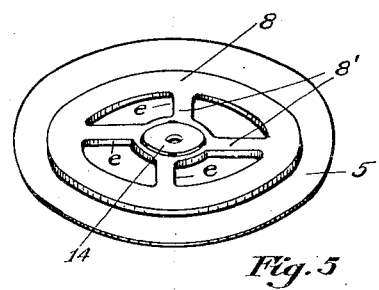
Inventor:
LEWIS H. HUTCHINSON.
BY
Henry L. Chenery.
Attorney.

Patented Mar. 11, 1930

1,749,767

UNITED STATES PATENT OFFICE

LEWIS H. HUTCHINSON, OF SOUTH PORTLAND, MAINE

PICTURE-GRAPH MACHINE

Application filed March 27, 1929. Serial No. 350,330.

This invention relates to picture machines somewhat on the order of the movie type, and its general object is to provide a low cost, mechanically actuated toy for exhibiting a series of pictorial views of animate subjects, in such a way as to give the appearance of motion or animation.

It requires considerable ingenuity on the part of a child to operate certain classes of mechanical toys, but if he is of the correct age and of a persevering turn of mind this type of plaything no doubt assists materially in training his intellect and developing his faculties, and as such, is highly commendable from an educational standpoint.

But with the very young person it is different, for he is unable to grasp ideas beyond his capacity to understand, which, with him of course, is very limited; and with this fact in mind I have conceived my present invention which necessitates the simple turning of a crank to demonstrate it, but which embodies in its structure sufficient mechanical mystery to appeal to the child's sense of curiosity.

Specifically, my invention consists in an intermittently revoluble disc upon which a plurality of pictures are either stamped or printed, the pictures which, preferably, represent animate subjects in different respective poses being consecutively exposed to view through an opening in the side of the container in which the disc and the operating mechanism therefor are housed.

A particular object, in connection with the exposition of the pictorial subjects is to provide convenient accessibility to the discs for the purpose of removal and substitution of other discs having thereon a different set of imprints.

The character of the invention may best be understood by reference to the following description, taken in connection with the accompanying drawings in which is disclosed an illustrative embodiment thereof which, at the present time, I consider preferable to other possible or equivalent forms in which the invention might be carried out.

In the drawings,—

Fig. 1 is a perspective view of the machine, showing particularly the front side of the container;

Fig. 2 is a perspective of the same, with the cover swung open and one of the picture discs brought into view;

Fig. 3 is a central sectional elevation of the machine;

Fig. 4 is a perspective view of the box, with the operating mechanism exposed to view;

Fig. 5 is a perspective of the back side of the picture disc, and

Fig. 6 is a perspective of a reinforcement disc.

Similar reference characters are employed to identify like parts in all views of the drawing.

Referring to the drawing, 1 is the box or container and 2 the cover therefor, hinged, as a matter of convenience, to the box, at 3. In the cover is cut an opening 4 through which the pictures $p$ on the disc 5 are visible.

In Figs. 3, 4 and 5 the operating mechanism is illustrated. On the inside of the box and secured thereto in any suitable manner is a thick disc 6, around the periphery of which is fixed the sleeve 7.

This sleeve (7) extends outwardly from the disc and on its outer edge revolves the circular turning plate 8 secured to the back side of the disc 5, the turning plate having spokes 8' with one radial side $e$ on each.

Mounted on the disc 6 is an arcuate rail 9, one end of which is cut on an incline from the disc 6 and the other end cut square therewith.

On the axis of the disc 6 is journalled a shaft 10 which extends through the back side of the box 1 and terminates in a crank handle 11. Secured to the shaft is a drive-plate 12 having one end projecting sufficiently far to ride the rail 9 when it is rotated in the direction indicated by the arrow, first passing up the inclined end of the rail, then along its top and dropping abruptly at the square end. The tapering end of the drive-plate is of sufficient flexibility to allow of its bending when riding the rail 9.

Located on the bendable end of the drive-plate 12 is an upstanding pawl 13 which, when the turning plate 8 is mounted on the